United States Patent
Sharma et al.

(10) Patent No.: US 12,382,366 B2
(45) Date of Patent: Aug. 5, 2025

(54) METHOD AND SYSTEM FOR INCLUDING DYNAMIC SERVICE AREAS IN ACCESS AND MOBILITY RESTRICTION CONTROL

(71) Applicant: Telefonaktiebolaget LM Ericsson (publ), Stockholm (SE)

(72) Inventors: Nipun Sharma, New Delhi (IN); Rajiv Bhardwaj, Jalandhar (IN); Ignacio Rivas Molina, Madrid (ES); Rakesh Bajpai, New Delhi (IN); Tushar Sabharwal, New Delhi (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 472 days.

(21) Appl. No.: 17/790,995

(22) PCT Filed: Jan. 31, 2020

(86) PCT No.: PCT/EP2020/052378
§ 371 (c)(1),
(2) Date: Jul. 6, 2022

(87) PCT Pub. No.: WO2021/151499
PCT Pub. Date: Aug. 5, 2021

(65) Prior Publication Data
US 2023/0013118 A1   Jan. 19, 2023

(51) Int. Cl.
*H04W 48/04* (2009.01)
*H04W 4/50* (2018.01)
(Continued)

(52) U.S. Cl.
CPC ............ *H04W 48/04* (2013.01); *H04W 4/50* (2018.02); *H04W 8/18* (2013.01); *H04W 48/16* (2013.01); *H04W 48/18* (2013.01)

(58) Field of Classification Search
CPC ......... H04W 48/04; H04W 4/50; H04W 8/18; H04W 48/16; H04W 48/18; H04W 12/80; H04L 67/142; H04L 67/30; H04L 67/535
(Continued)

(56) References Cited

U.S. PATENT DOCUMENTS

2012/0008604 A1* 1/2012 Kasslin ................ H04W 48/14
370/328
2019/0174449 A1* 6/2019 Shan ..................... H04W 60/04
(Continued)

FOREIGN PATENT DOCUMENTS

CN          109548178 A       3/2019

OTHER PUBLICATIONS

3rd Generation Partnership Project, "3rd Generation Partnership Project; Technical Specification Group Services and System Aspects; System Architecture for the 5G System; Stage 2 (Release 16)", Technical Specification, 3GPP TS 23.501 V16.1.0, Jun. 1, 2019, pp. 1-368, 3GPP.

(Continued)

*Primary Examiner* — Rownak Islam
(74) *Attorney, Agent, or Firm* — Weisberg I.P. Law, P.A.

(57) ABSTRACT

Methods performed in a core network (110) for dynamically handling access and mobility service areas with different capabilities in a communication system (100) are disclosed. The methods are carried out in an AMF node (111), a UDM node (112), a PCF node (113) and a SMF node (115). The UDM node (112) configures Service Area Restriction (SAR) data in a subscription data for a UE (120). The SAR data includes a number of service areas allowed or restricted for the UE and, for each service area, a service area identifier, a service area type and a service area definition. The PCF node configures a Service Area Definition (SAD) rule for a UE. The SAD rule comprises a service area definition and an indication of a set of service area characteristics enabled in the service area. During a registration procedure, the SAR data and SAD rule may be provided to the AMF node upon request for a UE communication. The AMF node then takes actions for the UE communication based on anyone of the SAR data, the SAD rule and local policies at the AMF node.

(Continued)

During a session management procedure, the SMF node (115) receives service area related information with a service area identifier and a service area type from the AMF node, and receives the SAD rule from the PCF node. The SMF node (115) then take actions for the UE communication based on the SAD rule, the information received from the AMF node (111) and/or local policies at the SMF node.

16 Claims, 5 Drawing Sheets

(51) Int. Cl.
  *H04W 8/18* (2009.01)
  *H04W 48/16* (2009.01)
  *H04W 48/18* (2009.01)
(58) Field of Classification Search
  USPC .......................................................... 370/230
  See application file for complete search history.

(56) References Cited

U.S. PATENT DOCUMENTS

| | | | | |
|---|---|---|---|---|
| 2020/0275513 | A1* | 8/2020 | Park | H04W 76/20 |
| 2021/0037375 | A1* | 2/2021 | Cakulev | H04W 8/186 |
| 2021/0084569 | A1* | 3/2021 | Kim | H04W 48/08 |
| 2022/0377529 | A1* | 11/2022 | Kim | H04W 8/08 |

OTHER PUBLICATIONS

3rd Generation Partnership Project, "3rd Generation Partnership Project; Technical Specification Group Services and System Aspects; Policy and Charging Control Framework for the 5G System; Stage 2 (Release 16)", Technical Specification, 3GPP TS 23.503 V16.1.0, Jun. 1, 2019, pp. 1-99, 3GPP.

3rd Generation Partnership Project, "3rd Generation Partnership Project; Technical Specification Group Core Network and Terminals; 5G System; Access and Mobility Policy Control Service; Stage 3 (Release 16)", Technical Specification, 3GPP TS 29.507 V16.0.0, Jun. 1, 2019, pp. 1-40, 3GPP.

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.3.0, Dec. 1, 2019, pp. 1-417, 3GPP.

3rd Generation Partnership Project, "3rd Generation Partnership Project; Technical Specification Group Services and System Aspects; Policy and charging control framework for the 5G System (5GS); Stage 2 (Release 16)", Technical Specification, 3GPP TS 23.503 V16.3.0, Dec. 1, 2019, pp. 1-112, 3GPP.

Nokia et al., "Updates to the Npcf_AMPolicyControl Procedures and Operations", 3GPP TSG-CT WG3 Meeting #93, Reno, USA, Nov. 27, 2017, pp. 1-4, C3-176197, 3GPP.

Nokia et al., "ServiceAreaRestriction encoding", 3GPP TSG CT4 Meeting #83 & 3GPP TSG CT3 Meeting #96, KunMing, China, Apr. 16, 2018, pp. 1-6, C4-183272 & C3-182284, 3GPP.

* cited by examiner

METHOD AND SYSTEM FOR INCLUDING DYNAMIC SERVICE AREAS IN ACCESS AND MOBILITY RESTRICTION CONTROL

TECHNICAL FIELD

Embodiments herein relate to methods for handling access and mobility service areas in a core network. In particular, they relate to method and system for Access & Mobility Restriction Control in a communication system.

BACKGROUND

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long Term Evolution (LTE), have been completed within the 3rd Generation Partnership Project (3GPP) and this work continues in the coming 3GPP releases, for example to specify a Fifth Generation (5G) New Radio (NR) network.

3GPP TS 23.501 defines Stage 2 system architecture for 5G System. One of the new features introduced in the area of user equipment (UE) mobility consists of supporting Mobility Restrictions. Mobility Restrictions restrict mobility handling or service access of a UE. Mobility Restrictions consists of Radio Access Technology (RAT) restriction, Forbidden Area, Service Area Restrictions (SAR) and Core Network type restriction.

RAT restriction defines the 3GPP Radio Access Technology, a UE is not allowed to access in a Public Land Mobile Network (PLMN).

In a Forbidden Area, a UE, based on subscription, is not permitted to initiate any communication with the network.

Service Area Restriction defines areas in which a UE may or may not initiate communication with the network as follows:
a) Allowed Area: a UE is permitted to initiate communication with the network as allowed by the subscription. The UE is registered in the network and update its location over Non-Access-Stratum (NAS), and can initiate session by e.g. a service request.
b) Non-Allowed Area: a UE is service area restricted based on subscription. The UE is allowed to register in the network and update its location, but cannot initiate communication. The UE and the network are not allowed to initiate Service Request i.e. no session management.

Core Network type restriction defines whether a UE is allowed to connect to 5G core network only (5GC), Evolved Packet Core (EPC) only, the core network of the LTE system, or both 5GC and EPC for this PLMN.

The core network determines the Mobility Restrictions based on UE subscription information, UE location and local policy. 5G Core Network Functions (NFs) comprises the following nodes:

Access and Mobility Management function (AMF).
Session Management function (SMF).
User plane function (UPF).
Policy Control Function (PCF).
Authentication Server Function (AUSF).
Unified Data Management (UDM).
Application Function (AF).
Network Exposure function (NEF).
NF Repository function (NRF).
Network Slice Selection Function (NSSF).

The UDM stores the Service Area Restrictions of a UE as part of the UE's subscription data. The PCF in the serving network may e.g. due to varying conditions such as UE's location, application in use, time and date further adjust Service Area Restrictions of a UE. During registration, if the Service Area Restrictions of the UE is not present in the AMF, the AMF fetches from the UDM the Service Area Restrictions of the UE that may be further adjusted by the PCF. The serving AMF shall enforce the Service Area Restrictions of a UE. For more details, see 3GPP TS 23.501, chapter 5.3.4.1.

Access and mobility restrictions are not specified by 3GPP in 4G, but implemented mainly by node specific configuration, which created a lot of vendor specific implementations.

Registration area management in 5G is based on the concept of mobility restrictions, with the objective to restrict mobility handling or service access of a UE. For example:
a) For stationary or low mobility users, the "Allowed area" can be limited, and thus allow a lower price subscription.
b) For enhanced Mobile Broadband (eMBB) users and high mobility users, no restrictions are applied.
c) For users accessing the network only via a fixed point, for instance, the "Allowed area" may be limited to only one Tracking Area (TA).

However, the current solution in 3GPP is limited to define either allowed or non-allowed areas. In addition, Allowed or Non-allowed areas apply to UE communication capability regardless of network slicing. 5GC network handles service area restrictions during registration and handover procedures, after network slice selection procedures. The AMF assigns service area restrictions to a UE that apply to all network slices the UE is currently attached to. Finally, service area restrictions are statically defined in the UDM and can only be adjusted by the PCF via operator policies.

SUMMARY

Therefore it is an object of embodiments herein to provide an improved method and system for handling access and mobility restrictions in a communication system.

According to one aspect of embodiments herein, the object is achieved by an AMF node and method performed therein in a core network for dynamically handling access and mobility service areas with different capabilities in a communication system. The AMF node transmits to a UDM node, a subscription data request for a UE communication. The AMF node receives from the UDM node, subscription data with SAR data for the UE. The SAR data includes a number of service areas allowed or restricted for the UE and, for each service area, a service area identifier, a service area type and a service area definition. The service area type may be any one of: secure area, sponsored area, parental control area and dynamic area. The AMF node transmits to a PCF node, a policy request for the UE. The AMF node receives from the PCF node a policy response with a Service Area Definition (SAD) rule for the UE. The SAD rule comprises a service area definition and an indication of a set of service area characteristics enabled in the service area. The AMF node then take actions for the UE communication based on anyone of the SAR data, the SAD rule and local policies at the AMF node.

According to one aspect of embodiments herein, the object is achieved by a UDM node and method performed therein in a core network for dynamically handling access and mobility service areas with different capabilities in a communication system. The UDM node configures SAR data for a UE. The SAR data includes a number of service areas allowed or restricted for the UE and, for each service area, a service area identifier, a service area type and a service area definition. The UDM node receives from the AMF node, a subscription data request for the UE and transmits to the AMF node the subscription data with the SAR data for the UE.

According to one aspect of embodiments herein, the object is achieved by a PCF node and method performed therein in a core network for dynamically handling access and mobility service areas with different capabilities in a communication system. The PCF node configures a Service Area Definition (SAD) rule for a UE. The SAD rule comprises a service area definition and an indication of a set of service area characteristics enabled in the service area. The PCF node receives from an AMF node a policy request for the UE and transmits to the AMF node, a policy response with the SAD rule for the UE. According to some embodiments, the PCF node may receive a Service Area Profile from provisioning system or from NEF and update dynamically SAR based on the received Service Area Profile. The PCF node may create a service area on-demand based on the received Service Area Profile.

According to one aspect of embodiments herein, the object is achieved by a SMF node and method performed therein in a core network for dynamically handling access and mobility service areas with different capabilities in a communication system. The SMF node receives from an AMF node a session request for a UE communication. The session request includes service area information with a service area identifier and a service area type. The SMF node transmits to a PCF node a policy request for the UE. The SMF node receives from the PCF node a policy response with a Service Area Definition (SAD) rule for the UE. The SAD rule comprises a service area definition and an indication of a set of service area characteristics enabled in the service area. The SMF node take actions for the UE communication based on the SAD rule, the information received from the AMF node and/or local policies at the SMF node.

According to one aspect of embodiments herein, the object is achieved by a core network and method performed therein for dynamically defining access and mobility service areas during registration procedure in a communication system. The core network receives by an AMF node from a UE a registration request; performs by the AMF node an Identity and Authentication procedure; initiates by the AMF node a registration request towards a UDM node; provides response by the UDM node according to registration details of the UE; requires by the AMF node for subscription data from the UDM node for the UE; provides by the UDM node the subscription data with SAR data for the UE. The SAR data includes a number of service areas allowed or restricted for the UE, and for each service area, a service area identifier, a service area type and a service area definition. The core network further sends a policy request by the AMF node to a PCF node for policies about access and mobility service areas; provides by the PCF node to the AMF node a Service Area Definition Rule for the UE comprising a service area definition and an indication of a set of service area characteristics enabled in the service area; takes actions by the AMF node based on anyone of the SAR data, the SAD rule and local policies at the AMF; and determines by the AMF node if the registration request is accepted or rejected based on the requirement of the service area.

According to one aspect of embodiments herein, the object is achieved by a core network and method performed therein for dynamically defining access and mobility service areas during session management procedure in a communication system. The core network receives by an AMF node a session establishment request from a UE; performs by the AMF node an Access & Mobility procedure and selects a SMF to be used. The core network initiates by the AMF node a session request towards the selected SMF to create an individual Session Management (SM) context for a given session, wherein the AMF node provides Service Area related information for the session to the SMF node. The core network further receives by the AMF node from the SMF node a response message including SM Context identity (ID); performs a PCF selection by the SMF node if dynamic Policy and Charging Control (PCC) is deployed; sends by the SMF node a Session Management Policy Establishment Request message to the PCF node to establish a session with the selected PCF and gets a default PCC Rules for the session. The core network further provides by the PCF node service area characteristics to the SMF node; updates by the SMF node the subscriber services according to the service area characteristics received from the PCF node and the Service Area related information for the session received from the AMF node; performs by the SMF node a UPF selection procedure; sends by the SMF node a Transfer Request message to the AMF node; and determines by the AMF node accepting or rejecting the session based on the Transfer Request message received from the SMF node.

Embodiments herein provide a mechanism to allow flexible definition of access and mobility service areas with different capabilities, for specific network slices, for different subscribers based on different use cases.

Embodiments herein provide solutions to Over-The-Top Application Function (OTT/AF) players to manage business needs in real-time for some use cases, e.g. Security and Parental control use cases, which can also be managed on demand by OTT/AF via NEF service exposure.

Embodiments herein provide a generic solution to implement service area restriction related use cases.

Therefore embodiments herein provide an improved method and system for handling access and mobility restrictions in a communication system.

BRIEF DESCRIPTION OF THE DRAWINGS

Examples of embodiments herein are described in more detail with reference to attached drawings in which.

DETAILED DESCRIPTION

As a part of developing embodiments herein some problems or limitations associated with the existing solutions will be first identified and discussed.

As discussed in the background, the current solution in 3GPP is limited to define either allowed or non-allowed areas. There is no means to define service areas with restricted capabilities e.g. a Secure Area with limited functionality or with additional security checks. The limitation of Service Area Restriction (SAR) of providing service in limited manner, i.e. Allowed & Not-Allowed only, is addressed according to embodiments herein.

In addition, Allowed or Non-allowed areas apply to UE communication capability regardless of network slicing. The PCF may further adjust Service Area Restrictions of a UE, but the update also applies to all network slices the UE is using.

Access and mobility restrictions are not specified by 3GPP in 4G, but implemented mainly by node specific configuration. For example, the applicant has provided a proprietary solution with a dedicated interface between mobility management entity (MME) and Policy and Charging Rules Function (PCRF) for location-based policy control. However, this interface does not handle service area restrictions, as defined in 5G, but enables use cases such as:

Dynamic allocation of the best radio resources on a per-user, per-terminal, per-location basis.
Preferred access for subscribers.
Dynamic selection of the Gateway GW based on, for example, the subscriber profile.

There is no mechanism for over-the-top Adaptation Function (OTT/AF) to manage service area restrictions. Such mechanism will allow OTT/AF to create, modify, or remove service area restrictions on demand well suited for business cases driven by Enterprise or OTT/AF.

Therefore according to embodiments herein, it is proposed to extend the concept of Service Area Restrictions (SAR), to allow flexible definition of service areas with different capabilities, for specific network slices, that can also be managed on demand by OTT/AF via NEF service exposure.

Flexible Service Area can provide Network operator to manage the access & mobility function on certain triggers which are not fully utilized. There are many scenarios where different treatment of services is required based on Service Area requested.

To describe this functionality, following examples of Service Areas may be considered:

Secure Area: Area with high security, this may be office of government security agencies, e.g. Federal Bureau of Investigation (FBI) or office of leader of the nation e.g. white house.

It may be required that, any subscriber entering this area should not be allowed to video upload or streaming websites. It may also be required that Lawful interception (LI) is enabled automatically for all subscriber which enters this sensitive area for real-time as well as offline analysis.

It may also require that Equipment Identity Register (EIR) should be enabled for these subscribers, in case EIR is not used for all subscribers. Further restriction may be to disallow Grey List UEs or UEs without standard International Mobile Equipment Identity (IMEI). For example, in India, EIR check is an optional feature for the implementation or usage by operators as this decrease the revenue generation.

Additionally, these services will be subscriber dependent as well. For example, Security officers, Diplomats, Very Important Person (VIP), basically trusted residents or office folks, in that area may not be affected by these policies.

Sponsored Area: In some cases, an OTT player or operator itself may want to sponsor the services to subscribers. For example, all services used in an Industrial Trade fair might be paid by the sponsors of trade fair. So, Billing or Charging functionality needs to be updated accordingly.
This may require that only certain Quality of Service (QOS) or quota is provided in this Area like at airport complimentary data surfing is allowed for "X" minutes with maximum speed capped at "Y Mbps".
This may be specific to certain enterprises as well and only few services are sponsored.

Parental Control Area: In some geographical areas like schools, library, college, academic institute etc., certain types of content can be blocked for all subscribers. People now implement this kind of control for individual subscribers e.g. students. But students may use mobile phones of other members of the house. So, it may be a good solution to restrict "explicit content" for all subscribers entering this area irrespective of age limit, subscription profile, etc.

All new service areas defined above are more or less static in nature and pre-defined. Having said that, these Service areas can be dynamic in nature which can be changed or modified on the fly by operator or enterprise as per their use case and same is highlighted below.

Dynamic Areas: All Service Areas can be used for static as well as dynamic Service area. For example, if considering Secure Area, this is similar to above service area, but this area might get modified dynamically. For example, if a president or king's envoy is moving to other location, e.g. from Palace to airport, then all the subscribers entering that area may be updated as per the Secure Area Policies.

These areas may be implemented in two ways:

Enumerated Lists: Different types of services areas may be defined which is represented by numbers so that all NFs recognize these areas and know which services to implement to subscribers which are in these area types. For example,
a. ServiceAreaType=1 (Secure Area)
b. ServiceAreaType=2 (Sponsored Area)
c. ServiceAreaType=3 (Parental Control Area)
Operator Defined: Other option is to use customized name or number for each type of service area. Also, what services to be implemented or removed for these areas is configured at each NF separately.

It is also possible to use a combination of both of the above. Some area types maybe defined as universal types, e.g. 1 to 10 and remaining service areas may be set as operator defined.

To implement the flexible Service Area, new parameters in UE subscription as well as update on PCF to AMF interface are proposed according to embodiments herein. This has impacts in both, the call flow for Registration and Session creation.

Figure 1:
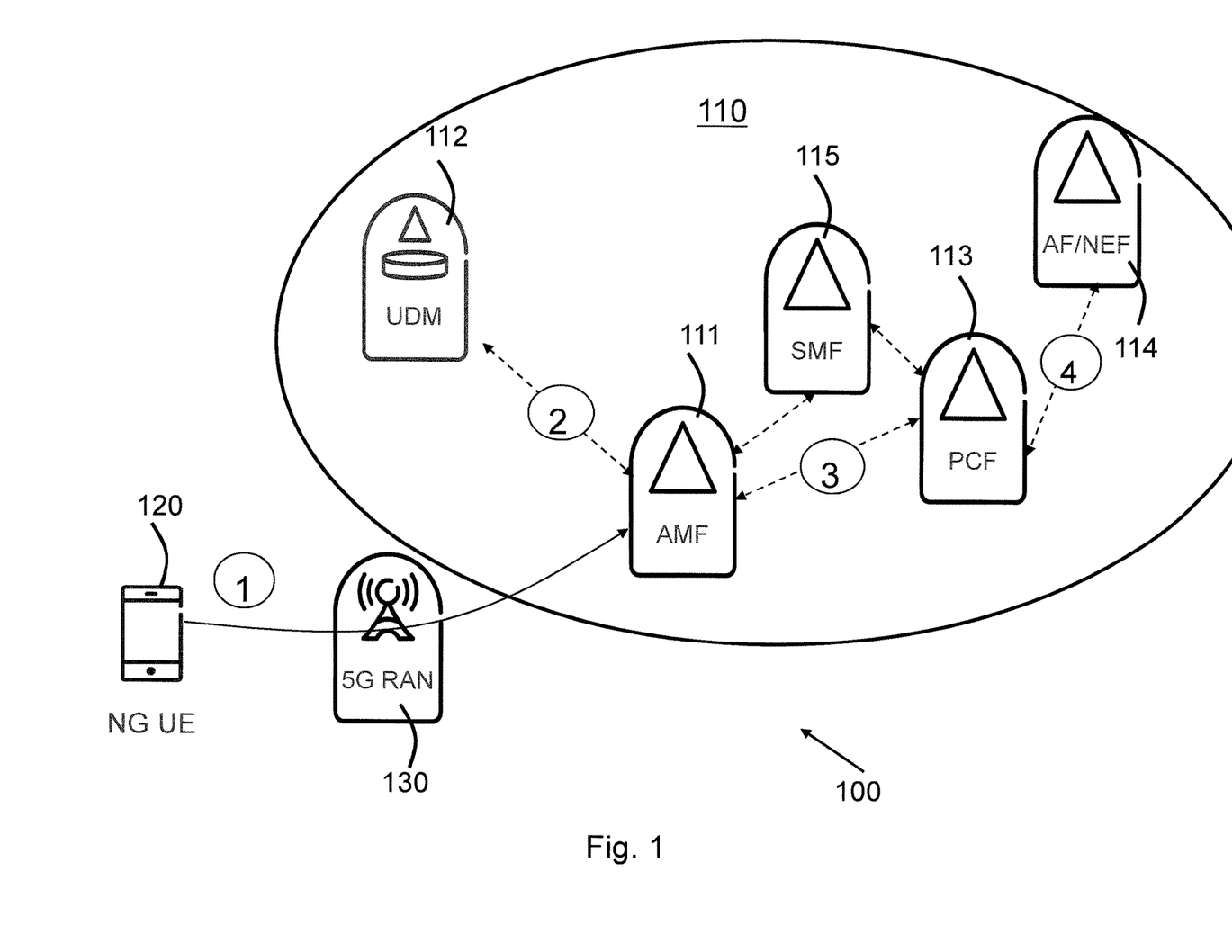
FIG. 1 is a schematic block diagram depicting an example of a communication system.

FIG. 1 illustrates a communication system 100 comprising a number of network nodes. The communication system 100 comprises a core network 110 comprising a number of core network function nodes, such as an AMF node 111, a UDM node 112, a PCF node 113, an AF/NEF node 114, a SMF node 115 etc. The communication system 100 further comprises a number of UEs and base stations, where a UE 120 and a base station 130 are shown.

Access and mobility service areas consist of a set of tracking areas where a UE is allowed to register and establish communication services with certain capabilities that make it suitable for certain scenarios or applications. For example, the operator may need to define certain service areas to provide communication services to the government or sensitive agencies that require fulfilling stringent security protocols. In such "secure areas" the network enables certain functionalities that are not typically required in the whole PLMN or network slice, such as secondary authentication or authorization, UE tracing and logging, lawful interception, etc.

As described above, a few examples of service areas with specific capabilities may be Secure Area with limited capacity and additional security features, Sponsored Area where OTT/AF can create, remove or manage the respective service area, Parental Control Area where certain types of content can be blocked for all subscribers. All Service Areas may be used for static as well as dynamic Service area where different capabilities may be modified dynamically.

A method for dynamically handling access and mobility service areas with different capabilities in a communication system 100 according to embodiment herein may be implemented in a core network, e.g. the core network 110. The method may be carried out at the AMF node 111 and will be described with reference to FIG. 2. The method comprises the following actions which may be performed in any suitable order.

Action 210

Figure 2:
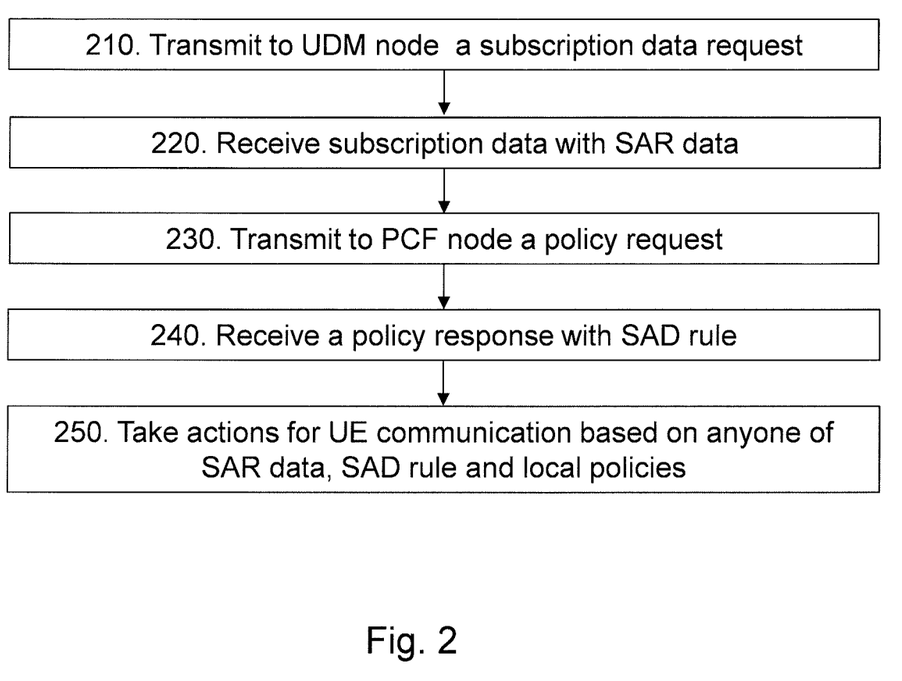
FIG. 2 is a flow chart illustrating a method performed in an AMF node according to embodiments herein.

When a UE, e.g. the UE 120 enters into service areas of a base station, the AMF node 111 receives a registration request from the UE via the base station 130. After the registration request, in order to handle the communication for the UE 120, the AMF node 111 transmits to the UDM node 112, a subscription data request for the UE 120 communication. At the UDM node, the Service Area Restriction (SAR) data for a subscriber includes a number of service areas allowed or restricted for the subscriber. Further, for each service area, the UE's subscription data in the UDM includes a service area identity, a service area type and a service area definition.

Action 220

The AMF node 111 receives from the UDM node 112, subscription data with Service Area Restriction (SAR) data for the UE. The SAR data includes a number of service areas allowed or restricted for the UE and, for each service area, a service area identifier, a service area type and a service area definition. The service area definition may be specified by using explicit Tracking Area identities (TAIs).

The number of service areas allowed or restricted for the UE indicates respective services allowed or restricted for the UE in each service area.

The service area type may be any one of secure area, sponsored area, parental control area and dynamic area.

The service area definition may comprise one or more TAIs identifying one or more Tracking Areas (TAs) that the service area comprises.

The AMF node 111 may determine a set of service area characteristics, i.e. a set of functionalities enabled in the service area by means of the configuration SAR data received from the UDM node 112, e.g. by mapping the service area identity and type to a pre-configured set of functionalities using, e.g. enumerated lists of different types of services areas representing Secure area, Sponsored area, Parental Control Area etc., or during interactions with the PCF node 113.

The service area characteristics may comprise any one or any combination of elements listed in the following:
a) An indication that lawful interception is enabled in a service area;
b) Address of Equipment Identity Register, EIR, to be used in a service area;
c) Service blacklist comprising a set of IP flows or application identifiers that are not allowed in a service area;
d) Sponsor Area Connectivity Profile to be used in a service area, which comprise Sponsor Identity, a set of sponsored services, a usage threshold that the sponsor expects the PCF to enforce, and/or Application Service Provider (ASP) address to report usage monitoring events;
e) An indication that Parental Control is enabled, and access to explicit content is restricted in a service area.

Action 230

The core network may determine access and mobility service areas based on dynamic information received from the PCF node 113. In this case, the AMF node 111 may determine a set of service area characteristics during the interactions with the PCF node 113. The AMF node 111 transmits to the PCF node 113, a policy request about access and mobility service areas for the UE 120.

Action 240

The AMF node 111 receives, from the PCF node 113, a policy response with a Service Area Definition (SAD) rule for the UE 120. The SAD rule comprises a service area definition and an indication of a set of service area characteristics enabled in the service area.

The SAD rule may also comprise one or more Network Slice Selection Assistance Information (NSSAI) that the service area applies to.

Action 250

The AMF node 111 takes actions for the UE communication based on anyone of the SAR data, the SAD rule and local policies at the AMF node.

The local policies at the AMF node 111 may define default values of the SAD rule when not provided by the PCF, and/or specify default actions to be taken for specific services areas or TAIs.

The AMF node 111 may take actions as per the Selected Service Area defined by TAIs. These actions may include, but not limited to:
a) Change of Network Slice to more secured network slice;
b) Selection of EIR e.g. in the same network slice;
c) Start of Lawful Interception (LI) etc.

Figure 3:
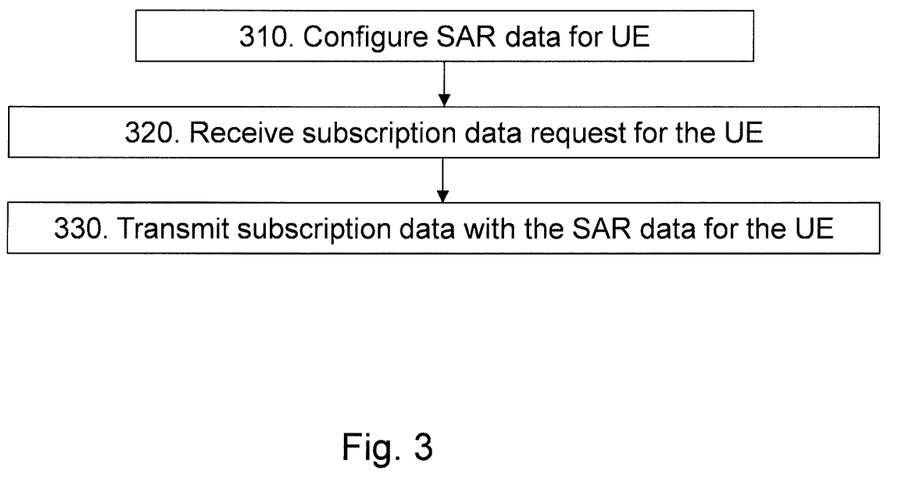
FIG. 3 is a flow chart illustrating a method performed in a UDM node according to embodiments herein.

According to embodiments herein, a method carried out at a UDM node 112 in a core network for dynamically handling access and mobility service areas with different capabilities in a communication system, will be described with reference to FIG. 3. The method comprises the following actions:

Action 310

The UDM node 112 configures SAR data for a UE 120. The SAR data includes a number of service areas allowed or restricted for the UE 120 and, for each service area, a service area identifier, a service area type and a service area definition. The number of service areas allowed or restricted for the UE indicates respective services allowed or restricted for the UE in each service area. The service area type may be any one of secure area, sponsored area, parental control area and dynamic area. The service area definition may comprise one or more tracking area identifier (TAI) identifying one or more TA that the service area comprises.

Action 320

The UDM node 112 receives from an AMF node 111 a subscription data request for the UE 120.

Action 330

The UDM node 112 transmits to the AMF node 111 subscription data with the SAR data for the UE 120.

Figure 4:
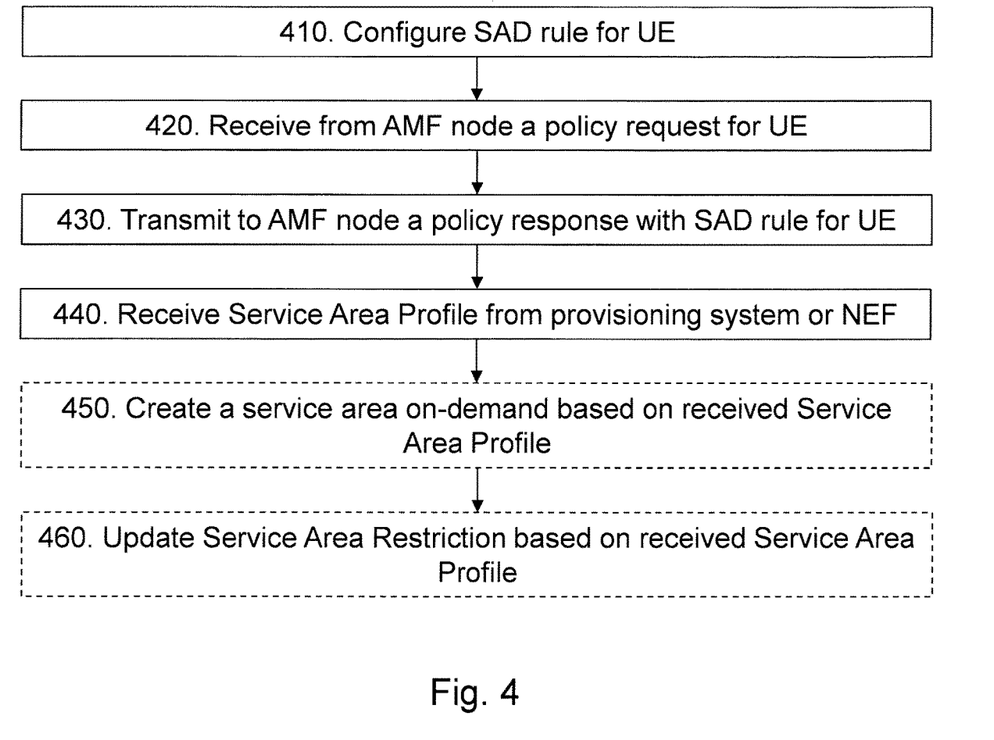
FIG. 4 is a flow chart illustrating a method performed in a PCF node according to embodiments herein.

According to embodiments herein, a method carried out at a PCF node 113 in a core network 110 for dynamically handling access and mobility service areas with different restrictions capabilities in a communication system 100, will be described with reference to FIG. 4. The method comprises the following actions:

Action 410

The PCF node 113 configures a Service Area Definition (SAD) rule for a UE. The SAD rule comprises a service area definition, e.g. a list of TAIs, and an indication of a set of service area characteristics enabled in the service area.

The SAD rule may comprise one or more Network Slice Selection Assistance Information (NSSAI) that the service area applies to, e.g. a list of S-NSSAIs.

The SAD rule may further comprise events that trigger a re-evaluation of the access and mobility service area policies, e.g. location change, change of allowed S-NSSAI, etc.

The PCF may configure the SAD rule based on the information received from the AMF node 111 in the AM Policy Association, static configuration, e.g. operator policies or during interaction with OTT/AF via a NEF node.

Action 420

The PCF node 113 receives from the AMF node 111, a policy request for the UE 120.

Action 430

The PCF node 113 transmits to the AMF node 111, a policy response with the SAD rule for the UE 120.

When the PCF node 113 configures the SAD rule, e.g. determines a set of service area characteristics, i.e. the set of functionalities enabled in the service area during interactions with the OTT/AF. The method may further comprise the following actions:

Action 440

The PCF node 113 may receive a Service Area Profile from provisioning system used by the service provider to update the configuration and subscription data in the core network nodes. Provisioning system uses Command Line Interface (CLI) or Application Programming Interface (API) to directly make configuration changes in the core network nodes.

The PCF node 113 may receive a Service Area Profile from the NEF node 114. The NEF node 114 may receive the Service Area Profile from any one of Operator Application Function, OTT Application Function, Data Analytics Function or Government Regulatory body.

The OTT/AF via the NEF node 114 may issue requests to the PCF node 113 to manage, e.g. create, modify, or remove access and mobility service areas. The OTT/AF may issue requests on behalf of applications not owned by the PLMN serving the UE. In this case, the method may further comprise the following actions:

Action 450

The PCF node 113 may create a service area on-demand based on the received Service Area Profile.

To create a service area, the OTT/AF provides a Service Area Profile, which may include:
  a) Geographical definition of the service area, e.g. longitude and latitude, zip code, etc.
  b) Service area type or a set of service area characteristics according to a previous agreement (SLA) reached between the network operator and the OTT.
  c) Applicability of the service area that may be either a group of UEs, i.e. a list of UE identities or an internal group identifier or all the UEs.

Action 460

The PCF node 113 may update dynamically Service Area Restriction based on the received Service Area Profile. The PCF node 113 may update type of Service Area where a subscriber is currently located. It may also update the Service Area itself. These inputs regarding service area may be provided by the provisioning system or by the NEF node 114.

The external Application Function (AF) may not be aware of the network based location details, i.e. TAIs, cells, base stations gNBs etc. So, it may provide the actual geographical location, e.g. Latitude & Longitude to NFs. But NFs do not understand these details. So, mapping of these parameters is needed. This may be done at the NEF node or may be at the PCF node.

Option 1: First, mapping between geographical location e.g. Latitude & longitude, and Network location e.g. TAIs, is done via provisioning system. Then provisioning system updates the PCF node or NEF node with the mapping of geographical location and Network location. It may be decided based on solution deployment, at which point this mapping will be done. This means that translation from geographical location to network location TAIs may also be done at the NEF or at the PCF as alternative.

The AF may provide Service Area Profile with a message Nnef_ParameterProvision_Update to the NEF node 114. The Service Area Profile may include:
  a) Service Area Definition, e.g. geographical definition of the service area with Latitude & Longitude,
  b) Service area type or an explicit set of Service Area Characteristics, e.g. LI & service barring etc.
  c) The applicability of the service area that may be either a group of UEs or all the UEs.

The NEF node 114 then updates the PCF node 113 about SAR. It may use the same location information provided by the AF or it may provide a list of TAIs based on where the mapping is configured.

Based on the mapping, the PCF node 113 then updates other NFs, e.g. AMF node 111 or SMF node about SAR. Procedures between the PCF node and other NFs will be described in the following section.

Option 2: The Service Area Profile may be directly provisioned in the PCF node 113 by the provisioning system instead of providing it as a part of service request from the NEF node 114.

Figure 5:
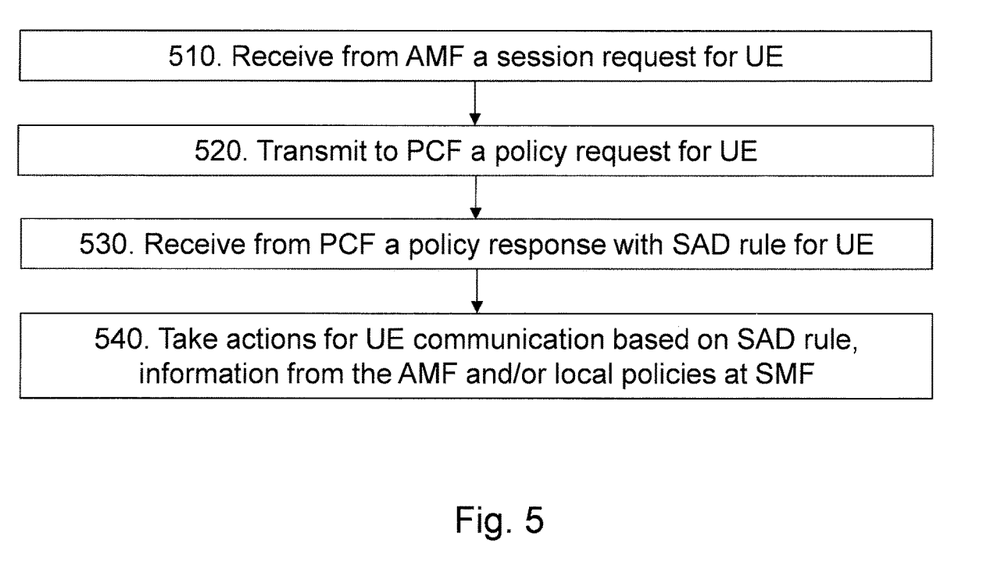
FIG. 5 is a flow chart illustrating a method performed in a SMF node according to embodiments herein.

According to embodiments herein, a method carried out at a SMF node, e.g. the SMF node 115 in a core network for dynamically handling access and mobility service areas with different capabilities in a communication system 100 will be described with reference to FIG. 5. The method comprises the following actions:

Action 510

The SMF node 115 receives from the AMF node 111, a session request for a UE communication. The session request includes service area related information with a service area identifier and a service area type. The service area related information may comprise any one of:
  a) An indication that Lawful interception is enabled in a service area;
  b) Address of Equipment Identity Register (EIR) to be used in a service area;
  c) Sponsor Identity.

Action 520

The SMF node 115 transmits to the PCF node 113 a policy request for the UE 120.

Action 530

The SMF node 115 receives from the PCF node 113, a policy response with a Service Area Definition (SAD) rule for the UE 120. The SAD rule comprises a service area definition and an indication of a set of service area characteristics enabled in the service area.

The set of service area characteristics may comprise any one of:
a) A service blacklist with identifiers not allowed in the service area;
b) A Sponsor Area Connectivity Profile, which includes anyone of a Sponsor Identity, a set of sponsored services, a usage threshold, and/or an address to report usage monitoring events; and
c) An indication of whether parental control is enabled in the service area.

Action 540

The SMF node 115 takes actions for the UE communication based on the SAD rule, the information received from the AMF node (111) and/or local policies at the SMF node 115. That is, in relation to the access and mobility service areas, the SMF node 115 combines the input received from the AMF node 111 with the input received from the PCF node and/or own information.

In the following, signaling flows for Registration and Session creation are described to see the impact of adding new capabilities related to the definition of flexible Service Areas.

Figure 6:
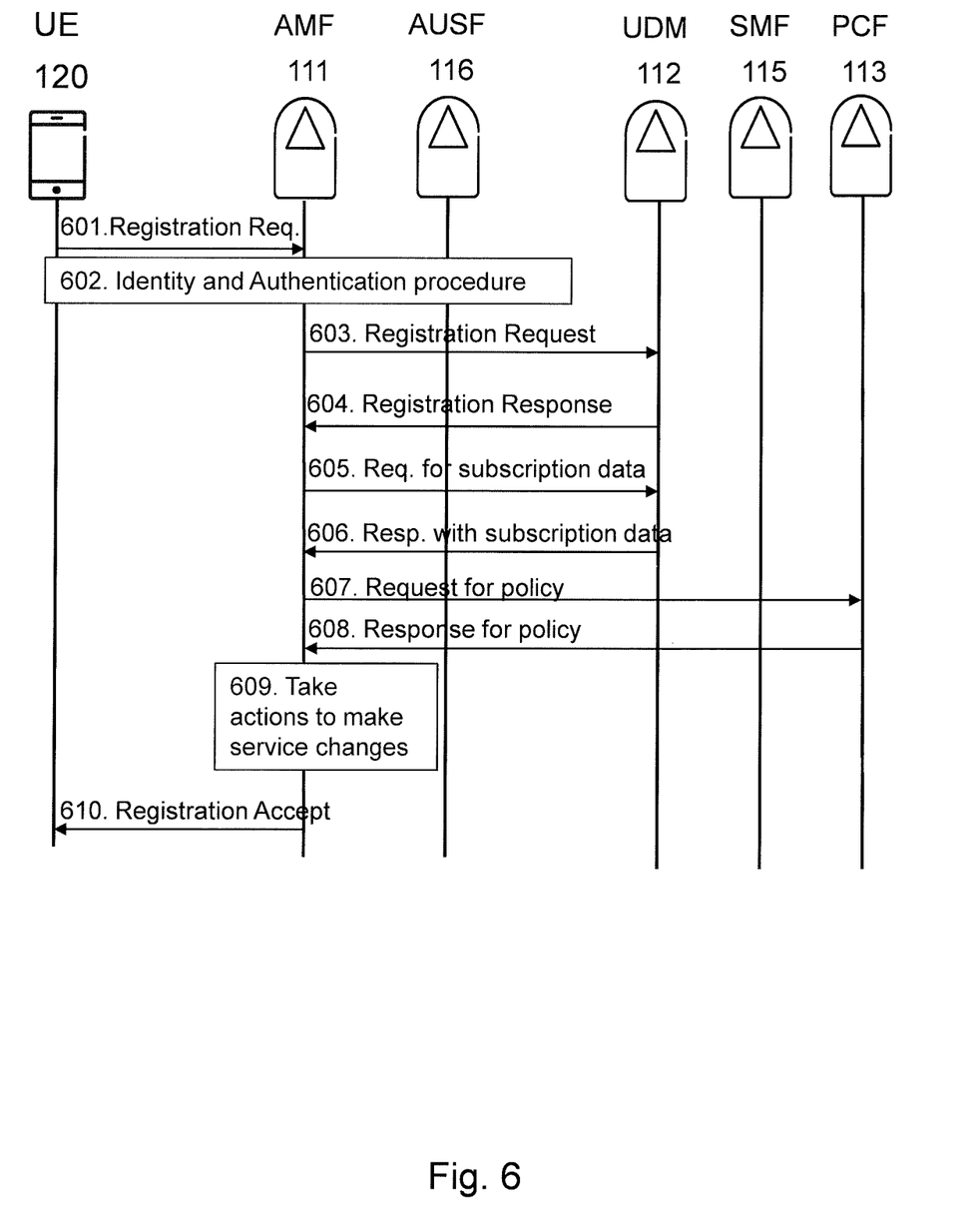
FIG. 6 is a signaling flow chart illustrating updated procedure for registration and session creation according to embodiments herein.

FIG. 6 shows an updated signaling flow for Registration procedure. A method performed in a core network 110 for dynamically defining access and mobility service areas during registration procedure a communication system 100 will be described with reference to FIG. 6.

As described above, the following configurations are made at the UDM node 112 and the PCF node 113:

UDM node 112: Service Area Restriction (SAR) data for a subscriber, which includes a number of service areas allowed or restricted for the subscriber and, for each service area, a service area identifier, a service area type and a service area definition.

PCF node 113: Service area restriction profiles and the necessary rules and conditions that define when a service area restriction profile applies to a subscriber or groups of subscribers. A service area restriction profile consists of a service area identifier, a service area type and a service area definition.

The method comprises the following steps or actions:
601: The AMF node 111 receives from a UE 120 a registration request via a base station 130.
602: The AMF node 111 performs an Identity and Authentication procedure. This is a standard procedure.
603: The AMF node 111 initiates a registration request towards the UDM node 112, with a Nudm_UEContextManagement_Registration Request message.
604: The UDM node 112 provides a response according to registration details of the UE 120, with a Nudm_UEContextManagement_Registration Response message.
605: The AMF node 111 requires for subscription data from the UDM node 112 for the UE 120, with a Nudm_SubscriberDataManagement_Get Request message. The requested data is Access and Mobility Subscription data.
606: The UDM node 112 provides the subscription data with SAR data for the UE 120, with Nudm_SubscriberDataManagement_Get Response. The UDM node provides all subscription data for the subscriber. It also includes ServiceAreaRestriction (SAR) related data. This data currently includes whether subscribers is subscribed or not. According to embodiments herein, additional parameters for SAR are provided by the UDM node 112 to indicate that subscriber is allowed or disallowed for certain services. So the SAR data includes a number of service areas allowed or restricted for the UE, with parameter ServiceAreaRestrictions, and for each service area, a service area identifier, e.g. ServiceAarealdentifier=100, a service area type, e.g. ServiceArea Type=Secure_Area and a service area definition, e.g. ServiceAreaDefinition=TA1, TA2.
607: After receiving the subscription data, the AMF node 111 may send a policy request Npcf_AMPolicyControlCreat_Req to the PCF node 113 for policies about access and mobility service areas.
608: The PCF node 113 sends a response Npcf_AMPolicyControlCreat_Rsp and provides to the AMF node 111 a Service Area Definition (SAD) Rule for the UE. The SAD rule may comprise any one or a combination of:
A service area definition, e.g. a list of TAIs;
Service area type or an indication of a set of service area characteristics enabled in the service area;
One or more Network Slice Selection Assistance Information (NSSAI) that the service area applies to, e.g. a list of Single NSSAI (S-NSSAIs);
Events that trigger a re-evaluation of the access and mobility service area policies, e.g. location change, change of allowed S-NSSAI, etc.

The service area characteristics may comprise any one of:
An indication that Lawful interception is enabled in a service area;
Address of Equipment Identity Register (EIR) to be used in a service area;
Sponsor Identity.
609: The AMF node 111 takes actions based on anyone of the SAR data, the SAD rule and local policies at the AMF node.

The AMF node 111 may take actions to make service changes as per the Selected Service Area defined by TAIs. These actions may include, but not limited to:
Change of Network Slice to more secured network slice;
Selection of EIR e.g. in the same network slice;
Start of Lawful Interception (LI) etc.
610: After this, the AMF node 111 determines if the registration request is accepted or rejected based on the requirement of the service area and informs the UE 120.

Figure 7:
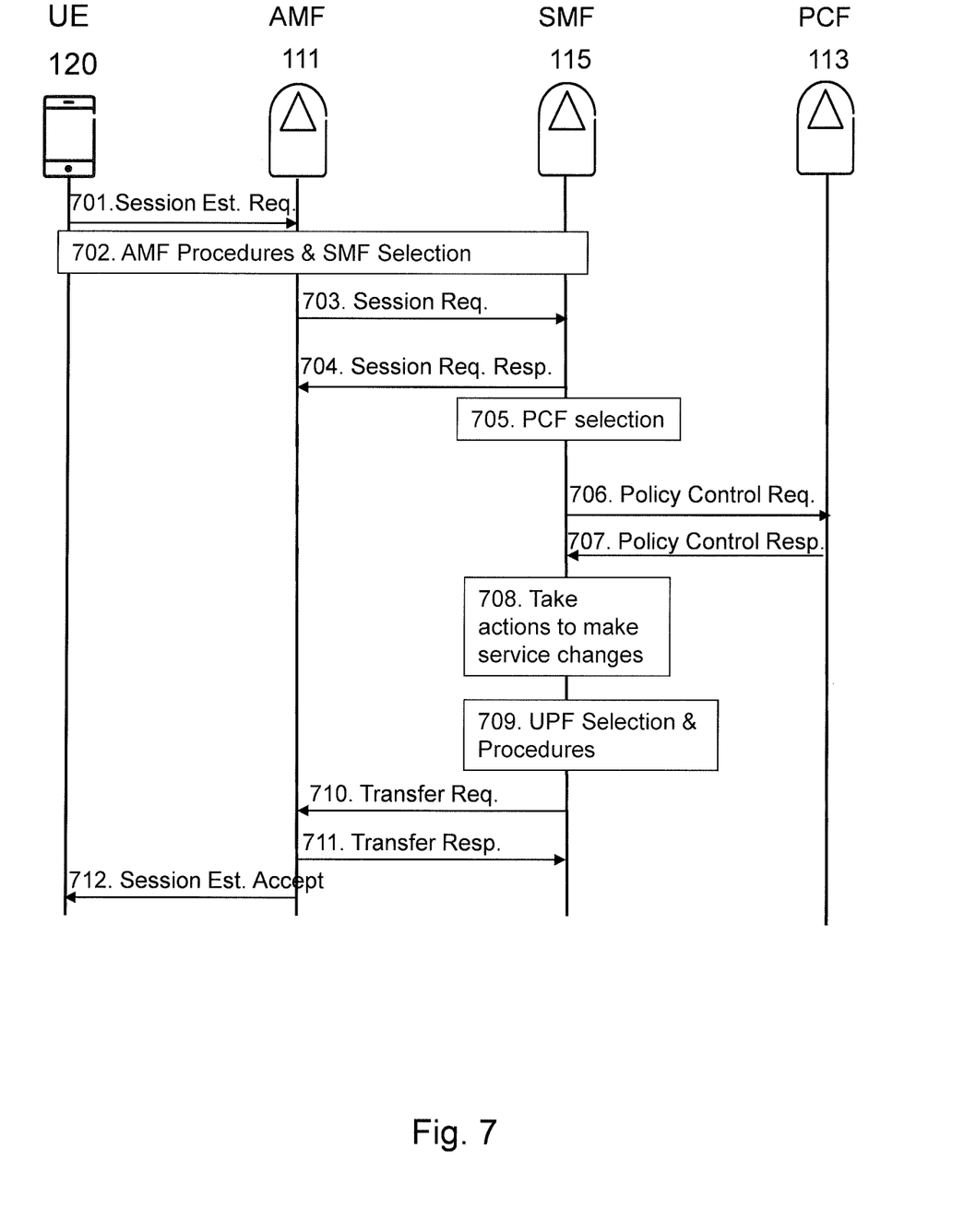
FIG. 7 is a signaling flow chart illustrating updated procedure for session management according to embodiments herein.

FIG. 7 shows an updated signaling flow for Session Management. A method performed in a core network 110 for dynamically defining access and mobility service areas during session management procedure a communication system 100 will be described with reference to FIG. 7.

The method comprises the following steps or actions:
701: The AMF node 111 receives from a UE 120 a session establishment request, e.g. a Protocol Data Unit (PDU) session in 5G. The session establishment request may include standard information including security, identity and slice information.
702: The AMF node 111 performs an Access & Mobility procedure and also selects the SMF node to be used for this session.
703: The AMF node 111 initiates a session request towards the selected SMF node 115 to create an individual Session Management (SM) context for a given session. The AMF node 111 provides Service Area related information for the session to the SMF node.

For example, the AMF node 111 sends a PDU Session Establishment Request by sending a Nsmf_PDUSession_CreateSMContext Request message to the SMF node 115 including Subscription Permanent Identifier (SUPI), Data Network Name (DNN), S-NSSAI, PDU Session ID, AMFID, Access Network Type (ANType), Request Type, SMContextStatusUri, N1 SM container etc. parameters as described in 3GPP TS 23.502. The request creates an individual SM context for a given PDU. The Service Area related information may be included in the Nsmf_PDUSession_CreateSMContext Request message.

The Service Area related information may include:

An indication that Lawful interception (LI) is enabled in the service area.

Address of the Equipment Identity Register (EIR) to be used in the service area.

Sponsor Identity if applicable.

704: The SMF node responds with a Nsmf_PDUSession_CreateSMContext Response message to the AMF node 111 including SM Context ID. The AMF node 111 receives from the SMF node the response message.

705: If dynamic PCC is deployed, the SMF node performs a PCF selection.

706: The SMF node 115 may perform a Session Management Policy Establishment procedure to establish a session with the selected PCF node 113 and get a default PCC Rules for the session. The SMF node sends a Session Management Policy Establishment Request message Npcf_SMPolicyControl Create Req. to the PCF node.

707: The PCF node responds with a Session Management Policy Establishment Response message Npcf_SMPolicyControl Create Rsp. to the SMF node to provide service area characteristics to the SMF node. The PCF node may provide policies as per "Service Area". It may also provide any special characteristics of that service Area. For the PDU session, the service area characteristics may include:

Service blacklist to indicate i.e. a set of IP flows or application identifiers that are not allowed in the service area.

The Sponsor Area Connectivity Profile to be used in the service area, which includes Sponsor Identity, a set of sponsored services, i.e. sponsored IP flows or application identifiers, a usage threshold that the sponsor expects the PCF node to enforce, and/or the ASP address to report usage monitoring events.

An indication that Parental Control is enabled, and access to explicit content is restricted in the service area.

708: Based on above information, the SMF node 115 may update the subscriber services according to the service area characteristics received from the PCF node 113 and the Service Area related information for the session received from the AMF node 111. The updating may comprise any one of disabling streaming services, activating LI for the subscriber, blocking some sites, providing sponsor data connectivity, or rejecting the session. For example, in a "Secure Area", e.g. FBI Headquarters, video streaming apps might be disabled. LI for the subscriber might be activated. Or in a School area all pornographic sites are blocked for all users. Further, SMF node may reject the session if it is not able to meet the mandatory requirement of "Service Area". For example, if LI is mandatary for a "Service Area" and the SMF node 115 is not able to support that, it may reject the session.

709: The SMF node 115 initiates a UPF selection procedure according to a local configuration. The SMF node 115 initiates an N4 Session Establishment procedure with the selected UPF node.

710: The SMF node 115 sends a Namf_Communication_N1N2_msg_Transfer Request message to the AMF node 111 including a N1 PDU Session Establishment Accept and N2 PDU Session Resource Setup Request Transfer messages.

711: The AMF node 111 responds a Namf_Communication_N1N2_msg Transfer Response message to the SMF node 115.

712: The AMF node 111 accepts or rejects the session as per the information received from the SMF node 115. The AMF node 111 determines accepting or rejecting the session based on the Transfer Request message received from the SMF node.

To summarize, methods performed in a core network 110 for dynamically handling access and mobility service areas with different capabilities in a communication system 100 are described. The methods may be carried out in an AMF node 111, a UDM node 112, a PCF node 113 and a SMF node 115. The UDM node 112 may configure Service Area Restriction (SAR) data in a subscription data for a UE 120. The SAR data includes a number of service areas allowed or restricted for the UE and, for each service area, a service area identifier, a service area type and a service area definition. The PCF node may configure a Service Area Definition (SAD) rule for a UE. The SAD rule comprises a service area definition and an indication of a set of service area characteristics enabled in the service area, one or more NSSAI that the service area applies to. The PCF node may receive a Service Area Profile from provisioning system or from NEF and update dynamically SAR based on the received Service Area Profile. The PCF node may create a service area on-demand based on the received Service Area Profile. During a registration procedure, the SAR data and SAD rule may be provided to the AMF node upon request for a UE communication. The AMF node then takes actions for the UE communication based on anyone of the SAR data, the SAD rule and local policies at the AMF node. During a session management procedure, the SMF node 115 may receive service area related information with a service area identifier and a service area type from the AMF node, and receive the SAD rule from the PCF node. The SMF node 115 then take actions for the UE communication based on the SAD rule, the information received from the AMF node 111 and/or local policies at the SMF node.

Therefore, the embodiments herein provide a mechanism to allow flexible definition of access and mobility service areas with different capabilities for e.g. 5G systems, for specific network slices, that can also be managed on demand by OTT/Enterprise via NEF service exposure. Few examples of service areas with specific capabilities are A. Secure Area, with limited capacity and additional security features, e.g. government security agencies.

B. Sponsored Area, where OTT/Enterprise want to sponsor services to subscribers, e.g. data services provided in an Industrial Trade fair.

C. Parental control service area, where certain type of content can be blocked for all subscribers, e.g. schools, library, college, university campus.

The embodiments herein allow flexible definition of access and mobility service areas with different capabilities, for specific network slices, for different subscribers based on the different use cases. The embodiments herein also provide new solutions to OTT/AF players to manage the business needs in real-time for use cases such as security, sponsoring and parental control.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method in a core network for dynamically handling access and mobility service areas with different capabilities in a communication system, the method carried out at an Access and Mobility Management function (AMF) node and comprising:
   transmitting, to a Unified Data Management (UDM) node, a subscription data request for a user equipment (UE) communication;
   receiving, from the UDM node, subscription data with Service Area Restriction (SAR) data for the UE, wherein the SAR data includes a number of service areas allowed or restricted for the UE and, for each service area, a service area identifier, a service area type, and a service area definition;
   transmitting, to a Policy Control Function (PCF) node, a policy request for the UE;
   receiving, from the PCF node, a policy response with a Service Area Definition (SAD) rule for the UE, the SAD rule comprising a service area definition and an indication of a set of service area characteristics enabled in the service area, the service area characteristics comprising one or more of:
      a Sponsor Area Connectivity Profile that comprises one or more of: a sponsor identity, a set of sponsored services, a usage threshold, and an address to report usage monitoring events; and
      an indication of whether parental control is enabled in the service area; and
   perform one or more actions for the UE communication based on the SAR data, the SAD rule, and local policies at the AMF node.

2. The method of claim 1 wherein the number of service areas allowed or restricted for the UE indicates respective services allowed or restricted for the UE in each service area.

3. The method of claim 1 wherein the service area type is any one of: secure area, sponsored area, parental control area, and dynamic area.

4. The method of claim 1 wherein the service area definition comprises one or more tracking area (TA) identifiers identifying one or more TAs that the service area comprises.

5. The method of claim 1 wherein the SAD rule comprises one or more Network Slice Selection Assistance Information (NSSAI) that the service area applies to.

6. A method in a core network for dynamically handling access and mobility service areas with different capabilities in a communication system, the method carried out at a Policy Control Function (PCF) node and comprising:
   configuring a Service Area Definition (SAD) rule for a user equipment (UE), the SAD rule comprising a service area definition and an indication of a set of service area characteristics enabled in the service area, the service area characteristics comprising one or more of:
      a Sponsor Area Connectivity Profile that comprises one or more of: a sponsor identity, a set of sponsored services, a usage threshold, and an address to report usage monitoring events; and
      an indication of whether parental control is enabled in the service area;
   receiving, from an Access and Mobility Management function (AMF) node, a policy request for the UE; and
   transmitting, to the AMF node, a policy response with the SAD rule for the UE.

7. The method of claim 6 wherein the SAD rule comprises one or more Network Slice Selection Assistance Information (NSSAI) that the service area applies to.

8. The method of claim 6 further comprising receiving a Service Area Profile from a provisioning system or from a Network Exposure Function (NEF) that received the Service Area Profile from any one of Operator Application Function, Over-The-Top (OTT) Application Function, Data Analytics Function, or Government Regulatory body.

9. The method of claim 8 further comprising creating a service area on-demand based on the received Service Area Profile.

10. The method of claim 8 further comprising updating dynamically Service Area Restriction based on the received Service Area Profile.

11. A method in a core network for dynamically handling access and mobility service areas with different capabilities in a communication system, the method carried out at a Session Management Function (SMF) node and comprising:
   receiving, from an Access and Mobility Management function (AMF) node, a session request for a user equipment (UE) communication, wherein the session request includes service area related information with a service area identifier and a service area type;
   transmitting, to a Policy Control Function (PCF) node, a policy request for the UE;
   receiving, from the PCF node, a policy response with a Service Area Definition (SAD) rule for the UE, the SAD rule comprising a service area definition and an indication of a set of service area characteristics enabled in the service area, the service area characteristics comprising one or more of:
      a Sponsor Area Connectivity Profile that comprises one or more of: a sponsor identity, a set of sponsored services, a usage threshold, and an address to report usage monitoring events; and
      an indication of whether parental control is enabled in the service area; and
   perform one or more actions for the UE communication based on one or more of: the SAD rule, the information received from the AMF node and local policies at the SMF node.

12. The method of claim 11 wherein the service area related information comprises any one of:
   an indication that Lawful interception is enabled in a service area;
   address of Equipment Identity Register (EIR) to be used in a service area;
   sponsor identity.

13. The method of claim 11 wherein the service area characteristics comprises:
   a service blacklist with identifiers not allowed in the service area.

14. An Access and Mobility Management function (AMF) node in a core network for dynamically handling access and mobility service areas with different capabilities in a communication system, the AMF node comprising:
- processing circuitry; and
- memory comprising program code executable by the processing circuitry, whereby execution of the program code by the processing circuitry configures the AMF node to:
  - transmit to a Unified Data Management, UDM, node, a subscription data request for a user equipment, UE, communication;
  - receive from the UDM node, subscription data with Service Area Restriction, SAR, data for the UE, wherein the SAR data includes a number of service areas allowed or restricted for the UE and, for each service area, a service area identifier, a service area type and a service area definition;
  - transmit to a Policy Control Function, PCF, node, a policy request for the UE;
  - receive from the PCF node, a policy response with a Service Area Definition, SAD, rule for the UE, the SAD rule comprising a service area definition and an indication of a set of service area characteristics enabled in the service area, the service area characteristics comprising one or more of:
    - a Sponsor Area Connectivity Profile that comprises one or more of: a sponsor identity, a set of sponsored services, a usage threshold, and an address to report usage monitoring events; and
    - an indication of whether parental control is enabled in the service area; and
  - perform one or more actions for the UE communication based on one or more of the SAR data, the SAD rule and local policies at the AMF node.

15. A Policy Control Function (PCF) node in a core network for dynamically handling access and mobility service areas with different capabilities in a communication system, the PCF node comprising:
- processing circuitry; and
- memory comprising program code executable by the processing circuitry, whereby execution of the program code by the processing circuitry configures the PCF node to:
  - configure a Service Area Definition (SAD) rule for a user equipment (UE) the SAD rule comprising a service area definition and an indication of a set of service area characteristics enabled in the service area, the service area characteristics comprising one or more of:
    - a Sponsor Area Connectivity Profile that comprises one or more of: a sponsor identity, a set of sponsored services, a usage threshold, and an address to report usage monitoring events; and
    - an indication of whether parental control is enabled in the service area;
  - receive from an Access and Mobility Management (AMF) node, a policy request for the UE; and
  - transmit to the AMF node, a policy response with the SAD rule for the UE.

16. A Session Management Function (SMF) node in a core network for dynamically handling access and mobility service areas with different capabilities in a communication system, the SMF node comprising:
- processing circuitry; and
- memory comprising program code executable by the processing circuitry, whereby execution of the program code by the processing circuitry configures the SMF node to:
  - receive, from an Access and Mobility Management (AMF) node, a session request for a user equipment (UE) communication, wherein the session request includes service area information with a service area identifier and a service area type;
  - transmit, to a Policy Control Function (PCF) node, a policy request for the UE;
  - receive, from the PCF node, a policy response with a Service Area Definition (SAD) rule for the UE, the SAD rule comprising a service area definition and an indication of a set of service area characteristics enabled in the service area, the service area characteristics comprising one or more of:
    - a Sponsor Area Connectivity Profile that comprises one or more of: a sponsor identity, a set of sponsored services, a usage threshold, and an address to report usage monitoring events; and
    - an indication of whether parental control is enabled in the service area; and
  - perform one or more actions for the UE communication based on the SAD rule, the information received from the AMF node and/or local policies at the SMF node.

* * * * *